US012558861B2

(12) United States Patent
Saito et al.

(10) Patent No.: US 12,558,861 B2
(45) Date of Patent: Feb. 24, 2026

(54) DUST COMPACTION SYSTEM

(71) Applicant: SINTOKOGIO, LTD., Nagoya (JP)

(72) Inventors: Koh Saito, Nagoya (JP); Shintaro Nishikawa, Nagoya (JP)

(73) Assignee: SINTOKOGIO, LTD., Nagoya (JP)

( * ) Notice: Subject to any disclaimer, the term of this patent is extended or adjusted under 35 U.S.C. 154(b) by 355 days.

(21) Appl. No.: 18/243,124

(22) Filed: Sep. 7, 2023

(65) Prior Publication Data

US 2024/0100796 A1 Mar. 28, 2024

(30) Foreign Application Priority Data

Sep. 28, 2022 (JP) ................................ 2022-154677

(51) Int. Cl.
*B30B 15/30* (2006.01)
*B30B 11/02* (2006.01)

(52) U.S. Cl.
CPC .......... *B30B 15/302* (2013.01); *B30B 11/025* (2013.01)

(58) Field of Classification Search
CPC ... B30B 11/06; B30B 15/0082; B30B 15/168; B30B 15/065; B30B 15/302
See application file for complete search history.

(56) References Cited

U.S. PATENT DOCUMENTS 4,108,063 A * 8/1978 Randolph ........... B30B 15/0082 53/527
2014/0238908 A1 8/2014 Tokuda et al.
2021/0154615 A1 5/2021 Suzuki et al.

FOREIGN PATENT DOCUMENTS

JP H4-123898 A 4/1992
JP 3176156 U 6/2012
JP 2021-084052 A 6/2021

* cited by examiner

*Primary Examiner* — Matthew Katcoff
(74) *Attorney, Agent, or Firm* — Faegre Drinker Biddle & Reath LLP

(57) ABSTRACT

A dust compaction system includes a compaction device including a hopper with an input port into which a dust is input and a discharge port from which the dust is discharged, and a compaction unit configured to form pellets by compressing the dust supplied from the discharge port of the hopper, and the dust compaction system further includes a suction device configured to suck in the hopper of the compaction device.

7 Claims, 6 Drawing Sheets

DUST COMPACTION SYSTEM

CROSS-REFERENCE TO RELATED APPLICATION

This application is based on Japanese Patent Application No. 2022-154677 filed with Japan Patent Office on Sep. 28, 2022, the entire contents of which are hereby incorporated by reference.

TECHNICAL FIELD

The present disclosure relates to dust compaction system.

BACKGROUND

Japanese Patent Application Laid-Open No. H04-123898 discloses a device for compress waste. The device includes a hopper for storing the waste, a compression chamber provided below the hopper, and compression means for compressing the waste from above and the sides of the compression chamber to compress the waste.

SUMMARY

In the device described in Japanese Patent Application Laid-Open No. H04-123898, if the waste is dust, the dust may be re-scattered when the dust is put into the hopper. The present disclosure provides a technology capable of reducing an amount of dust re-scattered to the outside of the device for compacting the dust.

A dust compaction system according to an aspect of the present disclosure includes a compaction device including a hopper with an input port into which dust is input and a discharge port from which the dust is discharged, and a compaction unit configured to form pellets by compressing dust supplied from the discharge port of the hopper. The dust compaction system further includes a suction device configured to suck in the hopper of the compaction device.

According to the present disclosure, in this device for compacting dust, the amount of the dust re-scattered outside the device can be reduced.

DETAILED DESCRIPTION

Figure 1:
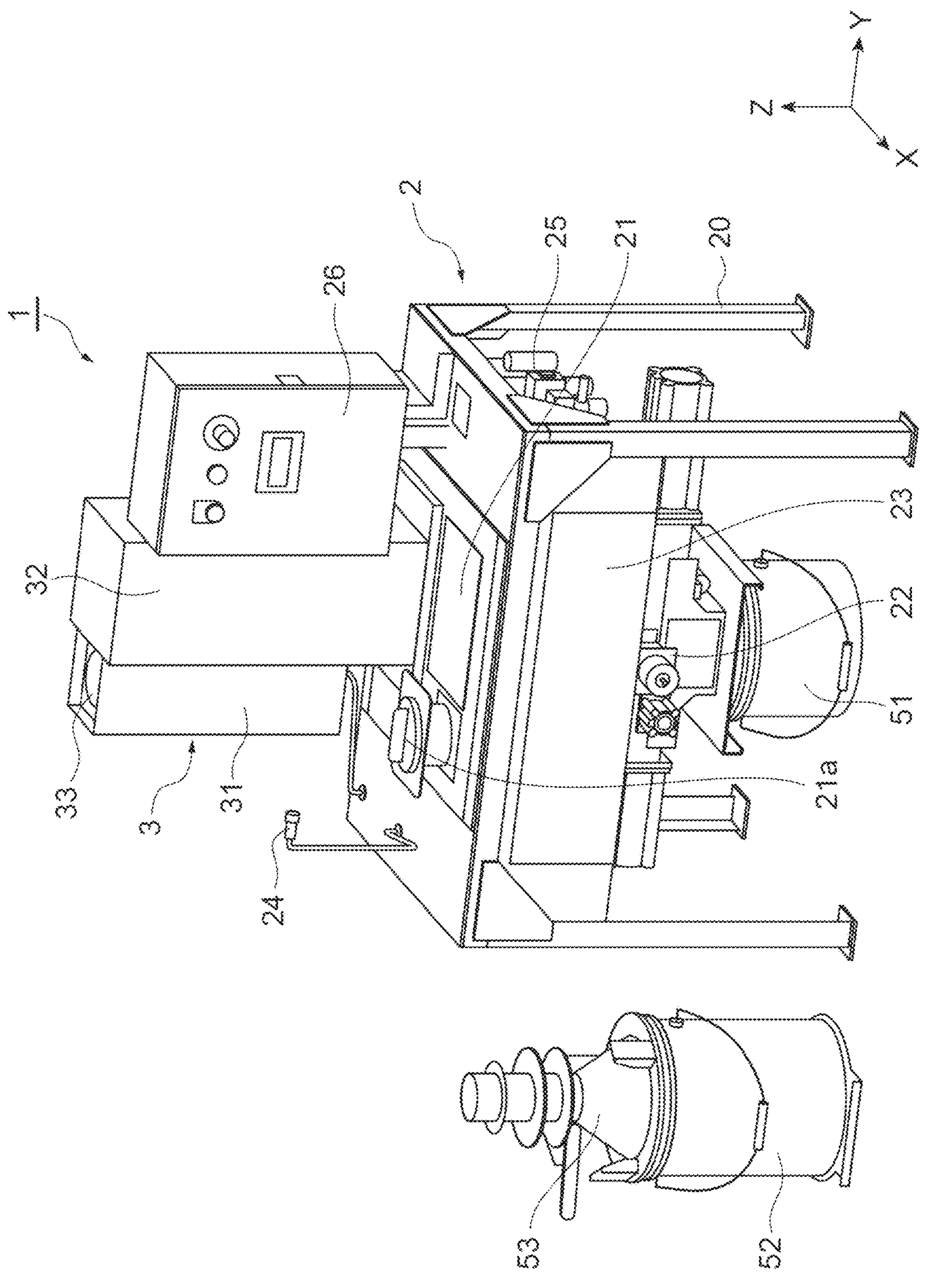
FIG. 1 is a perspective view illustrating a front side of a device of a dust compaction system according to an embodiment.

Summary of Embodiments of the Present Disclosure

First, an outline of an embodiment of the present disclosure will be described.

(Clause 1) A dust compaction system according to an aspect of the present disclosure includes a compaction device including a hopper with an input port into which the dust is input and a discharge port from which the dust is discharged, and a compaction unit configured to form pellets by compressing the dust supplied from the discharge port of the hopper. The dust compaction system further includes a suction device configured to suck in the hopper of the compaction device.

In the dust compaction system according to clause 1, the suction device sucks in the hopper of the compaction device. Thus, when the dust is input to the input port of the hopper, the dust is sucked into the hopper, and the dust is less likely to be blown out from the hopper. Therefore, the dust compaction system can reduce the amount of the dust re-scattered outside the device.

(Clause 2) In the dust compaction system according to clause 1, the compaction unit may include a pressurizing unit configured to compress the dust and a lower hopper disposed below the pressurizing unit and configured to store the dust discharged from the pressurizing unit. The dust compaction system may include a connection pipe connecting the lower hopper of the compaction unit and the hopper. In this case, the lower hopper is depressurized by the suction device through the connection pipe. For this reason, the dust discharged from the pressurizing unit is easily sucked into the lower hopper and accommodated in the lower hopper, and the dust is hardly blown out from the lower hopper. This allows the dust compaction system to reduce the amount of dust re-scattered outside the device, for example, when the pellets are removed from the compaction unit.

(Clause 3) The dust compaction system according to clause 2 may include a transfer unit provided to the connection pipe and configured to transfer the dust stored in the lower hopper to the hopper. The transfer unit allows the dust to be more reliably transferred from the lower hopper to the hopper.

(Clause 4) In the dust compaction system according to clause 3, the transfer unit may drive by air. Driving by air means that force (suction force or the like) for transferring the dust to the hopper is generated by air. The dust compaction system can suppress the occurrence of electric sparks and reduce the risk of igniting the dust because of using air-driving.

(Clause 5) In the dust compaction system according to clause 4, the pressurizing unit may include an air cylinder, and the transfer unit may drive by air exhausted from the air cylinder. In this case, the dust compaction system can reuse the air.

(Clause 6) In the dust compaction system according to any one of clauses 1 to 5, the suction device may drive by air. The dust compaction system can suppress the occurrence of electric sparks and reduce the risk of igniting the dust because of using air-driving.

(Clause 7) In the dust compaction system according to any one of the clauses 1 to 6 may include a suction tube connected to the input port of the hopper of the compaction device. Therefore, it is not necessary to lift the box containing the dust and pour the dust into the input port, and the dust in the box can be automatically put into the hopper of the compaction device only by putting the suction tube into the box.

EXAMPLES OF EMBODIMENTS OF THE PRESENT DISCLOSURE

Embodiments of the present disclosure will be described in detail with reference to the drawings. In the description of the drawings, the same elements are denoted by the same reference numerals, and redundant description is omitted. The dimensional ratios in the drawings are not necessarily consistent with those in the description. The terms “up”, “down”, “left” and “right” are based on the illustrated state and are for convenience.

[Example of Dust Compaction System]

The dust compaction system according to one embodiment is a system for compacting dust collected in a factory, for example. The dust is a fine powder that can float in gas, and includes fumes generated during laser processing, plasma processing, welding, and the like of metal materials and the like. The compaction means compacting the powder. In the present embodiment, an object obtained by compacting powder is referred to as pellets. The dust is collected by, for example, a dust collector and is stored in a pail can (box). The dust compaction system according to one embodiment forms the pellets by compacting the dust contained in the pail can or the like.

Figure 2:
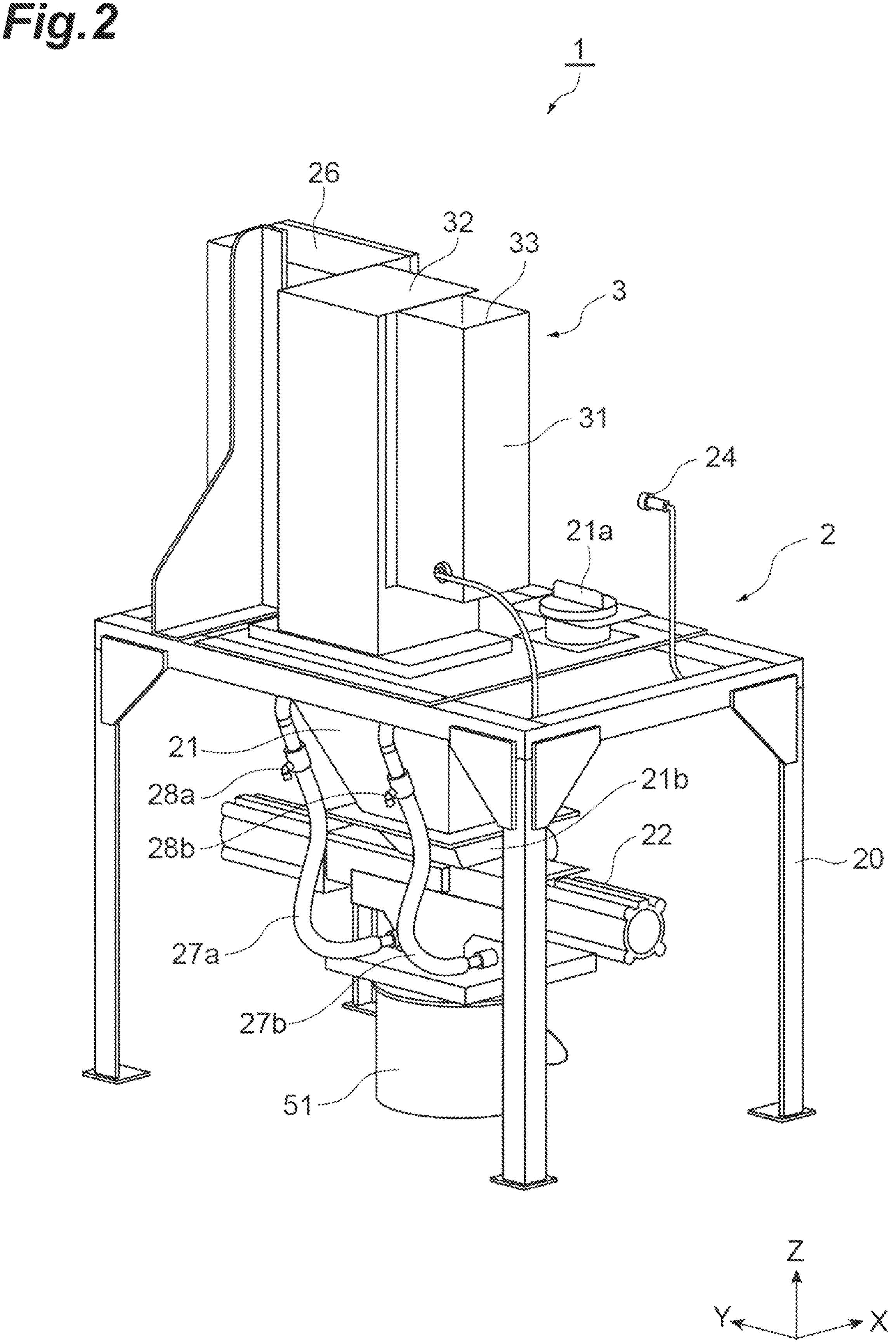
FIG. 2 is a perspective view illustrating a device rear surface of a dust compaction system according to an embodiment.
Figure 3:
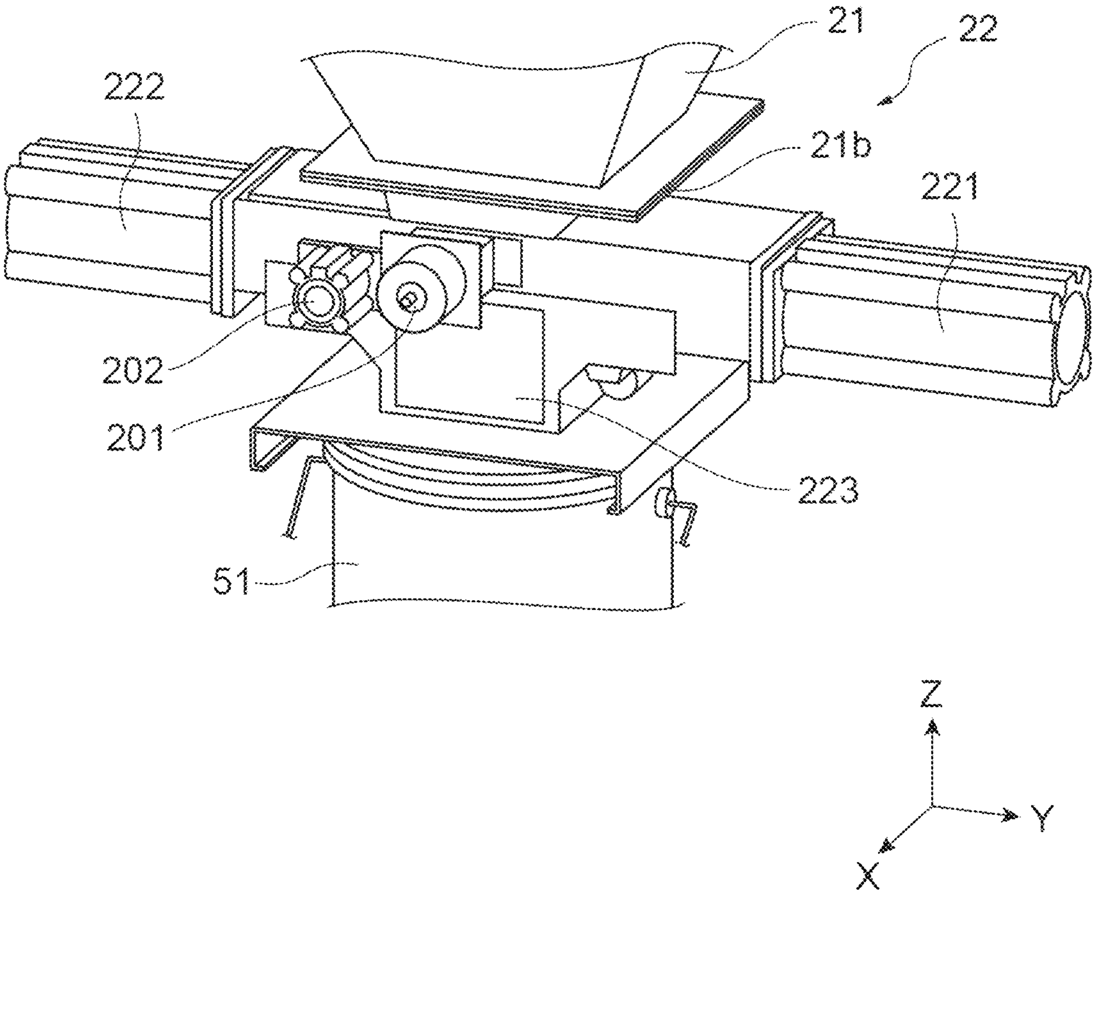
FIG. 3 is a perspective view of the compaction unit of FIG. 1.

FIG. 1 is a perspective view illustrating a front side of a device of a dust compaction system according to an embodiment. FIG. 2 is a perspective view illustrating a device rear surface of a dust compaction system according to an embodiment. FIG. 3 is a perspective view of a compaction unit 22 of FIG. 1. X direction and Y direction in the drawing are horizontal directions, and Z direction is a vertical direction. Hereinafter, the Z direction is also referred to as an up-down direction.

As shown in FIGS. 1 and 2, a dust compaction system 1 includes a compaction device 2 and a suction device 3. The compaction device 2 is a device for compacting the dust, and the suction device 3 is a device for preventing the dust re-scattering from the compaction device 2 to the outside of the device.

The compaction device 2 is supported by a frame 20. The compaction device 2 includes a hopper 21 and a compaction unit 22. The hopper 21 is a hollow vessel that is placed above the compaction unit 22 and stores the dust. The hopper 21 includes an input port 21*a* into which the dust is input and a discharge port 21*b* from which the dust is discharged. The input port 21*a* is formed in the upper part of the hopper 21 and the discharge port 21*b* is formed in the lower part of the hopper 21. The collected dust is thrown into the input port 21*a* of the hopper 21 by an operator or the like and stored in the hopper 21. The compaction unit 22 is connected to the discharge port 21*b* of the hopper 21, and the dust stored in the hopper 21 is supplied to the compaction unit 22.

As shown in FIG. 3, the compaction unit 22 is positioned below the hopper 21. The compaction unit 22 compresses the supplied dust to form pellets. The compaction unit 22 includes a pair of air cylinders 221, 222 (examples of a pressurizing unit) for compressing the dust. The rods of the pair of the air cylinders 221, 222 are disposed to face each other. A pressurizing chamber filled with the dust is defined between the rods, and the dust in the pressurizing chamber is compressed by moving at least one rod of the pair of the air cylinders 221, 222. The formed pellets fall from the pressure chamber by the action of a discharge cylinder 202 into a discharge chute 223 connected below the compaction unit 22. The pellets falling into the discharge chute 223 are discharged into a discharge pail can 51 located below the discharge chute 223.

It should be noted that the compaction unit 22 may be provided with a stirring actuator 201 for agitating the dust at the lower end of the hopper 21 to stabilize the filling of the dust from the hopper 21 into the compaction unit 22.

The compaction device 2 has an air piping system for operating each component. The air piping system has a supply port 25 connected to an air supply source. The air piping system has a valve for controlling air supplied to the supply port 25, a pair of the compaction unit 22 such as the air cylinders 221, 222 in the compaction unit 22, the discharge cylinder 202, the stirring actuator 201 and the like. The valve of the air piping system is housed in a valve case 23 shown in FIG. 1. Details of the air piping system will be described later.

The dust to be compressed is collected in a charge pail can 52 shown in FIG. 1. The operator wears an attachment 53 on the charge pail can 52. The attachment 53 has a discharge port that communicates with the interior of the charge pail can 52 and engages the input port 21*a*. The operator turns the charge pail can 52 upside down to engage the attachment 53 with the input port 21*a* of the hopper 21. The dust in the charge pail can 52 is supplied to the hopper 21 by gravity. The attachment 53 has a sieve for preventing contamination inside. Thus, the dust is supplied to the hopper 21 through the sieve, and metal pieces larger than the dust are prevented from being supplied to the hopper 21.

As shown in FIGS. 1 and 2, the compaction device 2 may be provided with an air pipe 24 to allow the dust in the charge pail can 52 to be efficiently deposited into the hopper 21 the input port 21*a*. The air is supplied to the air pipe 24 by the above-described air piping system. The attachment 53 includes an air inlet connectable to the air pipe 24. The air pipe 24 is connected to the air inlet of the attachment 53 when the attachment 53 is engaged in the input port 21 of the hopper 21. As a result, air is supplied from the air pipe 24 into the attachment 53 through the air inlet, the sieve in the attachment 53 is vibrated by the air, and the dust in the charge pail can 52 is efficiently thrown into the hopper 21.

The suction device 3 is arranged above the hopper 21, for example. The suction device 3 includes an exhaust ejector 31 for sucking in the hopper 21. The exhaust ejector 31 drives by air supplied by the above-described air piping system. The hopper 21 communicates with the outside of the device via a filter 32 and an exhaust port 33. When the exhaust ejector 31 operates, the gas in the hopper 21 is exhausted to the outside of the device through the filter 32 and the exhaust port 33. By operating the suction device 3 in this manner, the inside of the hopper 21 becomes negative pressure.

The suction device 3 operates, as an example, to throw the dust in the charge pail can 52 into the input port 21*a* of the hopper 21. Thus, when the dust is thrown into the input port 21*a* of the hopper 21, the dust to be blown out from the hopper 21 is sucked into the hopper 21.

Figure 4:
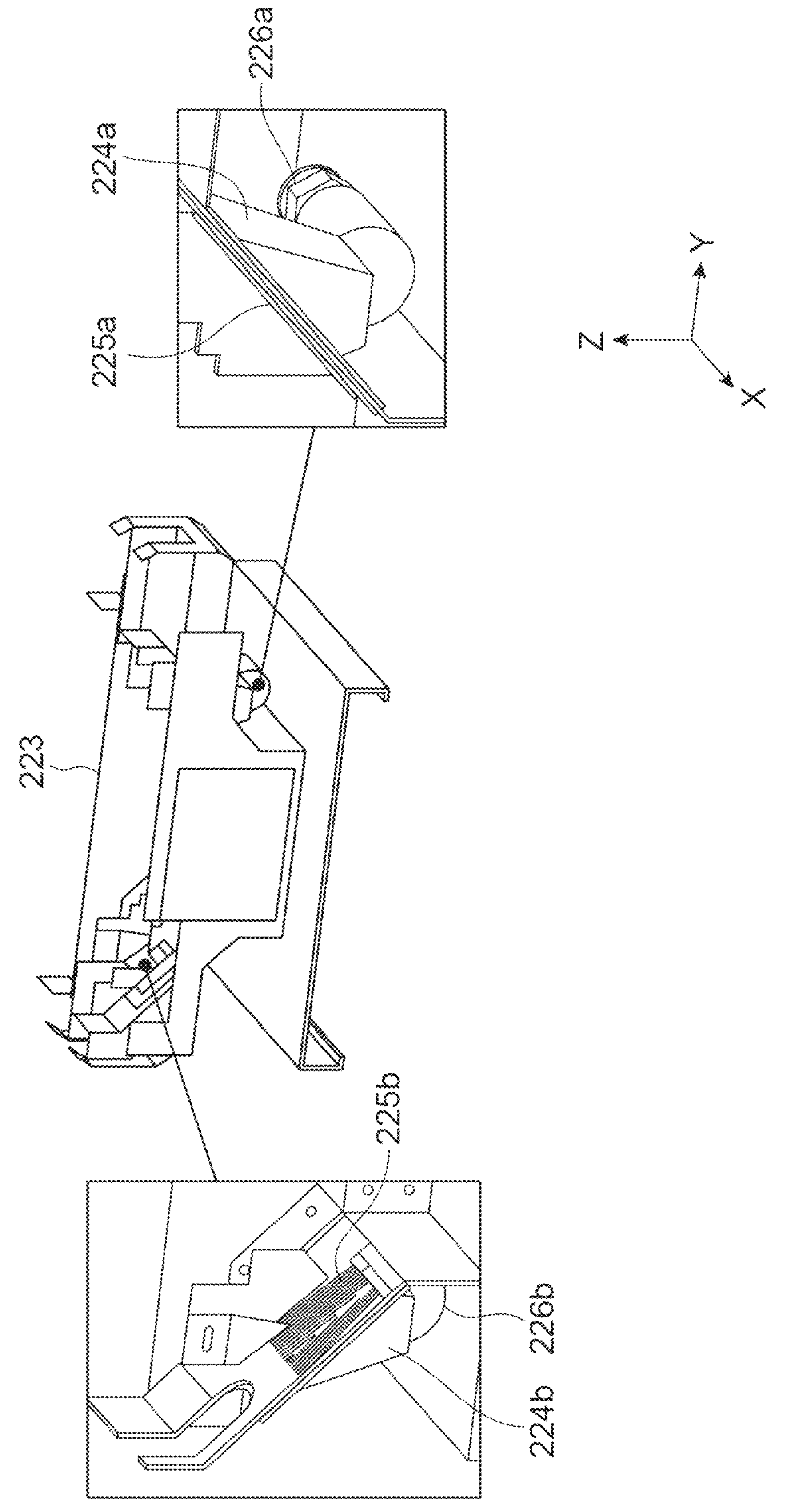
FIG. 4 is a detail view of the discharge chute shown in FIG. 3.

The compaction device 2 may further include a configuration to prevent the dust re-scattering outside the device when discharging the pellets from the discharge chute 223. FIG. 4 is a diagram for explaining details of the discharge chute 223 in FIG. 3. As shown in FIG. 4, for example, two lower hoppers 224*a*, 224*b* are provided in the discharge chute 223 disposed below the pair of the air cylinders 221, 222. The two lower hoppers 224*a*, 224*b* are provided with suction ports 225*a*, 225*b*, respectively. The suction ports 225*a*, 225*b* are constituted as slits for passing the dust. The dust dropped from the pair of the air cylinders 221, 222 or the dust attached to the pellets is stored in the lower hoppers 224*a*, 224*b* via the suction ports 225*a*, 225*b*. In addition, small fragments generated when the compressing of the pellets is insufficient and the dust separated from the compaction device 2 are also accommodated in the lower hoppers 224*a*, 224*b*, and are prevented from being discharged to the outside of the device.

The lower hoppers 224*a*, 224*b* of the compaction unit 22 may be connected to the hopper 21. Discharge ports 226*a*, 226*b* are provided at lower ends of the lower hoppers 224*a*, 224*b*. The discharge ports 226*a*, 226*b* are connected to the hopper 21 by connection pipes 27*a*, 27*b*. When the inside of the hopper 21 becomes negative pressure by the suction device 3, the insides of the lower hoppers 224*a*, 224*b* are decompressed through the connection pipes 27*a*, 27*b*. Therefore, the dust discharged from the pair of the air cylinders 221, 222 is easily accommodated in the lower hoppers 224*a*, 224*b*, and the dust to be blown out from the lower hoppers 224*a*, 224*b* is sucked into the lower hoppers 224*a*, 224*b*. The dust stored in the lower hoppers 224*a*, 224*b* is sucked up through the connection pipes 27*a*, 27*b* and returned to the hopper 21.

The connection pipes 27*a*, 27*b* may be provided with transfer ejectors 28*a*, 28*b* (examples of transfer units) in order to more efficiently reduce the pressure in the lower hoppers 224*a*, 224*b*. The transfer ejectors 28*a*, 28*b* drives by air supplied by the above-described air piping system. The dust stored in the lower hoppers 224*a*, 224*b* is sucked up more efficiently by the transfer ejectors 28*a*, 28*b* and returned to the hopper 21.

An operation panel 26 is a controller that integrally controls the dust compaction system 1. The operation panel 26 is configured as, for example, a programmable logic controller (PLC). The operation panel 26 may be configured as a computer system including a processor such as a central processing unit (CPU), memories such as a random access memory (RAM) and a read only memory (ROM), input/output devices such as a touch panel, a mouse, a keyboard, and a display, and a communication device such as a network card. The operation panel 26 operates each component of the dust compaction system 1 under the control of a processor based on a computer program stored in memory.

[Example of Air Piping System]

Figure 5:
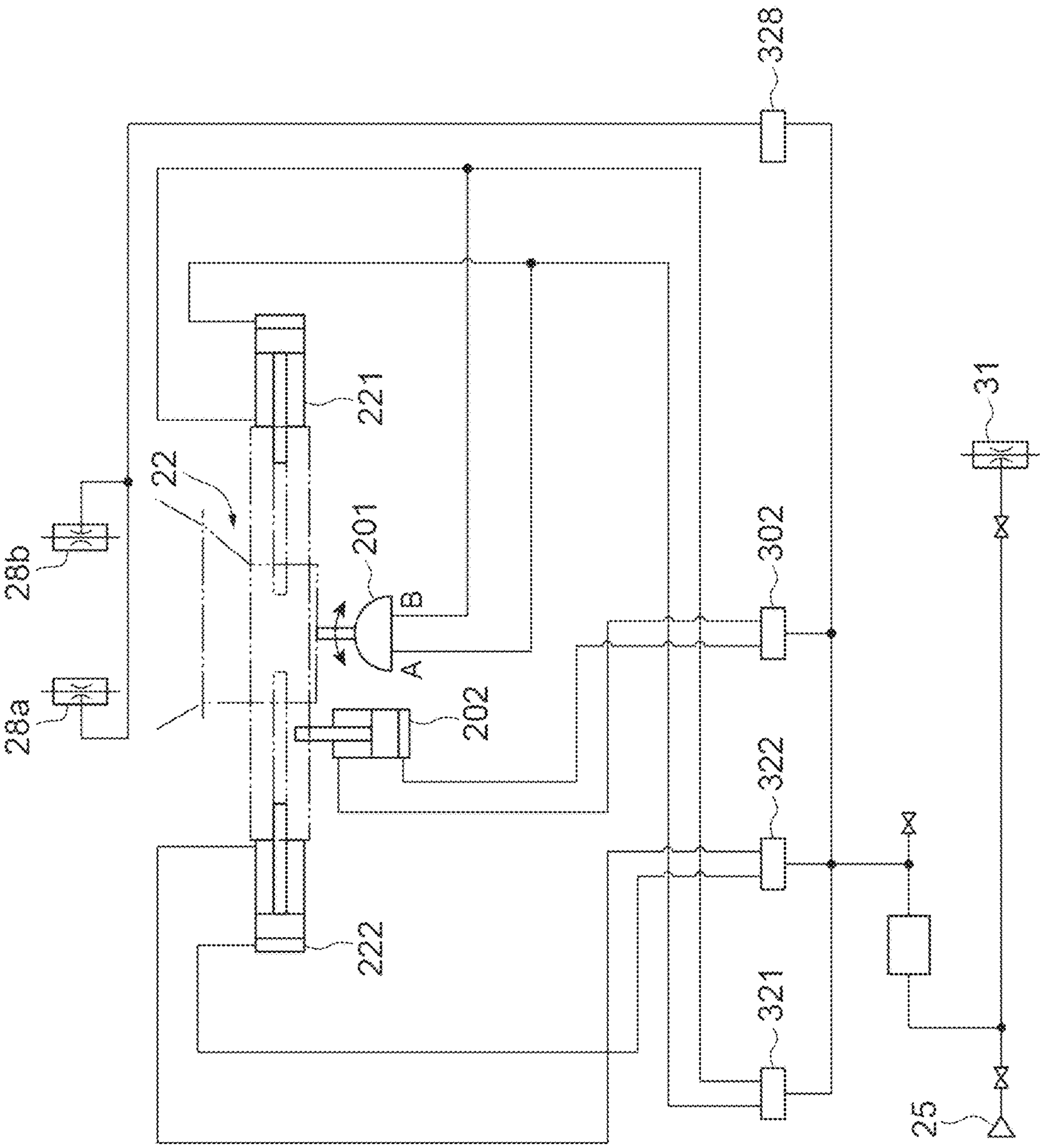
FIG. 5 is an air piping system diagram of a dust compaction system.

FIG. 5 is an air piping system diagram of the dust compaction system 1. As shown in FIG. 5, air is supplied to the air piping system from the supply port 25 shown in the lower left of the figure. The supplied air is mainly branched into two ways and supplied to the compaction unit 22 and the exhaust ejector 31. A pipe line connected to the air pipe 24 is omitted.

The air supplied to the compaction unit 22 is supplied to each component via a solenoid valve. Air is supplied to the air cylinder 221 and the stirring actuator 201 via a first solenoid valve 321. Air is supplied to an air cylinder 222 via a second solenoid valve 322. Air is supplied to the discharge cylinder 202 via a third solenoid valve 302.

The first solenoid valve 321, the second solenoid valve 322, and the third solenoid valve 302 can supply the air exhausted from the pair of the air cylinders 221, 222 and the discharge cylinder 202 to the fourth solenoid valve 328. Air is supplied to the transfer ejectors 28*a*, 28*b* through a fourth solenoid valve 328. Since the transfer ejectors 28*a*, 28*b* are driven by air exhausted from the pair of the air cylinders 221, 222 and the discharge cylinder 202, it is not necessary to supply new air, and energy-saving and dust re-suction becomes possible. In addition, since the components of the dust compaction system 1 are operated by air, the generation of an electric spark can be suppressed, and the ignition risk to the dust is reduced.

SUMMARY OF EMBODIMENT

In the dust compaction system 1, the suction device 3 sucks in the hopper 21 at the compaction device 2 to create a negative pressure. Therefore, when the dust is thrown into the input port 21*a* of the hopper 21, the dust is sucked into the hopper 21, and the dust is hardly blown out from the hopper 21. Thus, the dust compaction system 1 can reduce the amount of dust re-scattered outside the device.

While various exemplary embodiments have been described above, various omissions, substitutions, and changes may be made without being limited to the exemplary embodiments described above.

Figure 6:
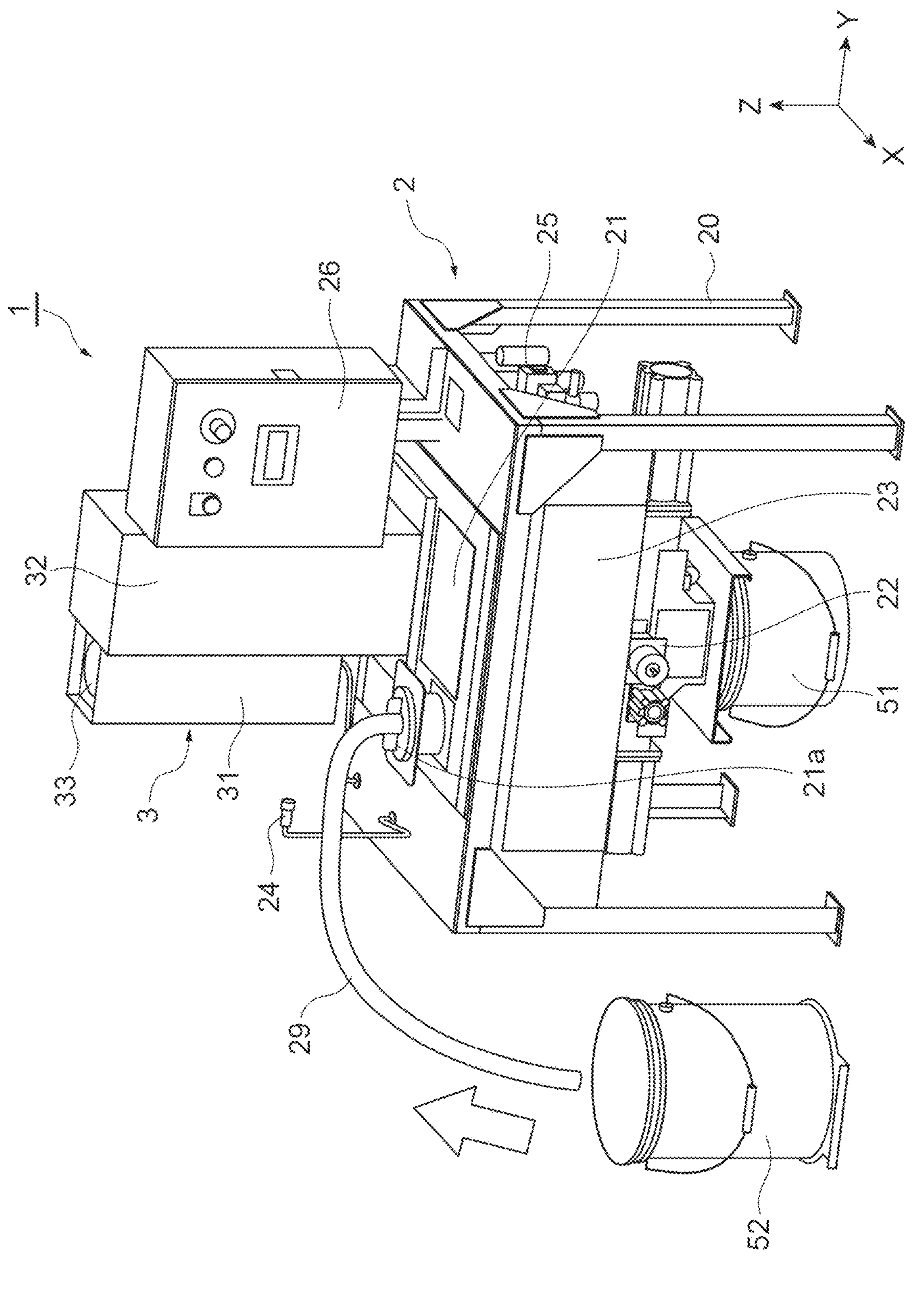
FIG. 6 is a perspective view showing a front surface of a device of a dust compaction system according to a modification.

FIG. 6 is a perspective view showing a front surface of a device of a dust compaction system according to a modification. As shown in FIG. 6, the dust compaction system 1 may include a suction tube 29 connected to the input port 21*a* of the hopper 21 of the compaction device 2. The tip of the suction tube 29 is inserted into the charge pail 52. Thus, it is not necessary to lift the charge pail 52 containing the dust and pour the dust into the input port 21*a*, and the dust in the charge pail 52 is automatically thrown into the hopper 21 of the compaction device 2.

The dust compaction system 1 need not include two lower hoppers, but may include one lower hopper or three or more lower hoppers. Also, the dust compaction system 1 may not include a lower hopper.

What is claimed is:

1. A dust compaction system, comprising:

a compaction device including:

a hopper with an input port into which a dust is input and a discharge port from which the dust is discharged; and a compaction unit configured to form pellets by compressing the dust supplied from the discharge port of the hopper; and a suction device configured to suck in the hopper of the compaction device.

2. The dust compaction system according to claim 1, wherein the compaction unit includes:

a pressurizing unit configured to compress the dust; and a lower hopper disposed below the pressurizing unit and configured to store the dust discharged from the pressurizing unit, and further comprising a connection pipe connecting the lower hopper of the compaction unit and the hopper.

3. The dust compaction system according to claim 2, further comprising a transfer unit provided to the connection pipe and configured to transfer the dust stored in the lower hopper to the hopper.

4. The dust compaction system according to claim 3, wherein the transfer unit drives by air.

5. The dust compaction system according to claim 4, wherein the pressurizing unit includes an air cylinder, and the transfer unit drives by air exhausted from the air cylinder.

6. The dust compaction system according to claim 1, wherein the suction device drives by air.

7. The dust compaction system according to claim 1, further comprising a suction tube connected to the input port of the hopper of the compaction device.

* * * * *